United States Patent
Fang

(10) Patent No.: US 7,210,978 B2
(45) Date of Patent: May 1, 2007

(54) ELECTRON-EMISSION TYPE FIELD-EMISSION DISPLAY AND METHOD OF FABRICATING THE SAME

(75) Inventor: Jin-Shou Fang, Taipei (TW)

(73) Assignee: Teco Nanotech Co., Ltd., Taoyuan (TW)

( * ) Notice: Subject to any disclaimer, the term of this patent is extended or adjusted under 35 U.S.C. 154(b) by 322 days.

(21) Appl. No.: 10/823,758

(22) Filed: Apr. 14, 2004

(65) Prior Publication Data

US 2005/0231097 A1   Oct. 20, 2005

(51) Int. Cl.
 *H01J 1/304* (2006.01)
(52) U.S. Cl. .................... 445/51; 445/50; 313/497; 313/496; 427/77
(58) Field of Classification Search ........ 313/309–311, 313/495–497; 445/50–51; 427/77
See application file for complete search history.

(56) References Cited

U.S. PATENT DOCUMENTS

| | | | | |
|---|---|---|---|---|
| 5,828,162 A | * | 10/1998 | Danroc et al. .............. 313/309 |
| 6,024,622 A | * | 2/2000 | Ohoshi ........................ 445/51 |
| 6,059,623 A | * | 5/2000 | Kim et al. .................... 445/24 |
| 6,448,709 B1 | * | 9/2002 | Chuang et al. ............. 313/497 |
| 6,741,025 B2 | * | 5/2004 | Tuck et al. .................. 313/495 |
| 6,750,604 B2 | * | 6/2004 | Lee et al. .................... 313/495 |
| 6,940,220 B2 | * | 9/2005 | Nakashima et al. ........ 313/495 |

\* cited by examiner

*Primary Examiner*—Karabi Guharay

(57) ABSTRACT

An electron-emission type field-emission display and a method of fabricating the same are disclosed, of which the beeline distance of the electron emission is identical. The structure of the field-emission display has a cathode electrode so configured that beeline distances between all surface points of the cathode electrode and a gate conductive layer thereover are identical. The cathode electrode is fabricated from a silver paste and a carbon nanotube. To configure the silver paste, a gray-scale mask with a gradient light transmission rate from a center to a periphery thereof is used as a photomask to perform exposure upon the silver paste.

4 Claims, 4 Drawing Sheets

ELECTRON-EMISSION TYPE FIELD-EMISSION DISPLAY AND METHOD OF FABRICATING THE SAME

BACKGROUND OF THE INVENTION

The present invention relates in general to an electron-emission type field-emission display and a method of fabricating the same, and more particular, to a cathode electrode having a configuration that the beeline distance between every surface point of the cathode electrode layer and a gate conductive layer over the cathode electrode is identical.

The invention of carbon nanotube (CNT) has stimulated a novel competition in the development of minimizing nanotechnology globally. Currently, application of the carbon nanotube in optoelectronic display includes carbon-nanotube field-emission display (CNT FED), which is the most potential flat display panel as recognized in the industry. The conventional field-emission display is constructed by a front panel and a substrate, which generates a spike discharge at the cathode spike to emit an electron beam. The electron beam then impinges the phosphor layer coated on the screen to generate image. Such type of display has the characteristics of larger display area, shorter response time, and wider viewing angle. Thereby, it can be broadly applied to electronic products that require flat panel display to replace the conventional cathode ray tube (CRT) screen.

The front panel and the substrate are housed in a vacuum package. A spacer is disposed between the front panel and the substrate to prevent the glass plate from being broken by atmosphere pressure. In the past, the high fabrication cost becomes a bottle neck of the development of the field-emission display. However, the development of carbon nanotube resolves the high-cost issue while the image quality of cathode ray tube is maintained. The carbon nanotube field-emission display also includes the power saving and small-volume features.

However, the current carbon-nanotube field-emission display is still problematic in application. FIG. 1 illustrates conventional field-emission display that includes an anode electrode layer 1a and a cathode electrode layer 2a. The anode electrode layer 1a includes a substrate 11a, a first conductive layer 12a on the substrate 11a, and a second conductive layer 13a covering the second conductive layer 12a. The first and second conductive layers 12a and 13a construct an anode 14a to be impinged by an electron beam from a cathode 26a. The cathode electrode layer 2a includes a substrate 21a, a first conductive layer (silver paste) 24a (silver paste) formed on the substrate 21a and a second conductive layer (carbon nanotube) 25a formed on the first conductive layer 24a. The first and second conductive layers 24a and 25a construct the cathode 26a. A dielectric layer 26a is formed on the substrate 2a around the cathode 26a, and the field-emission display further comprises a gate conductive layer 3a formed on the dielectric layer 22a. The gate conductive layer 3a has a through hole 31a aligned over the cathode 26a. As shown, the beeline distance between the periphery area of the second conductive layer 25a and the gate conductive layer 3a is shorter than that between the central area of the second conductive layer 25a and the gate conductive layer 3a. Therefore, the electric field at the periphery area of the second conductive layer 25a is higher than that of the central area of the second conductive layer 25a. As a result, the electrons drained at the periphery have a density larger than that of the electrons drained at the central area. The distribution of electrons results in a donut-shape electron beam. The non uniform distribution of electrons also results in leakage of electron beams through the gate conductive layer 3a.

BRIEF SUMMARY OF THE INVENTION

The present invention provides a cathode so structured that the beeline distance between any point the cathode and a gate conductive layer is identical. Therefore, a uniform electric field is resulted at all points of the cathode. Therefore, the electron emission from the cathode is uniform, and an electron beam with a uniform distribution is generated. As a result, the image quality is enhanced.

The cathode structure provide by the present invention has a higher center and a lower periphery. That is, the center of the cathode gradually descends towards the periphery thereof, such that the beeline distance between each point of the cathode structure and the gate conductive layer is identical to generate a uniformly distributed electron beam.

BRIEF DESCRIPTION OF THE DRAWINGS

These as well as other features of the present invention will become more apparent upon reference to the drawings therein.

DETAILED DESCRIPTION OF THE INVENTION

Figure 1:
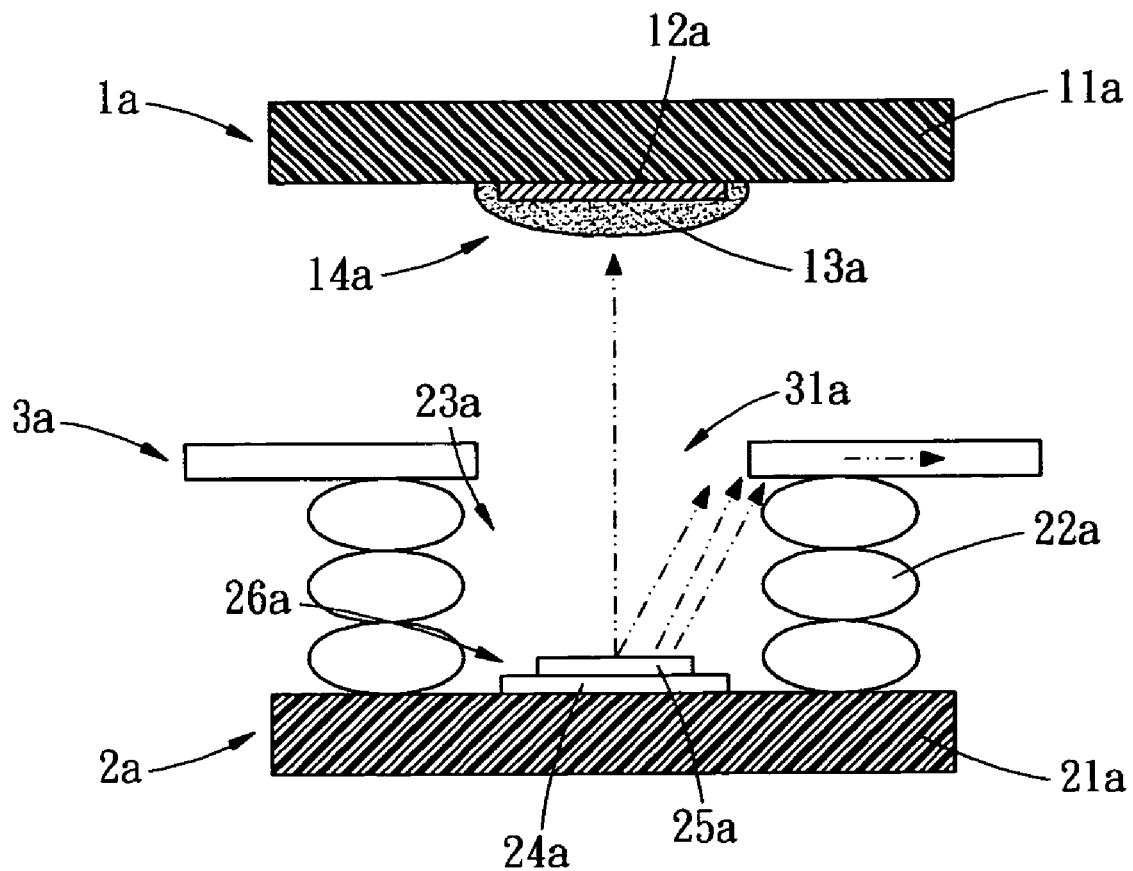
FIG. 1 illustrates a pixel structure of a conventional carbon-nanotube field-emission display.
Figure 2:
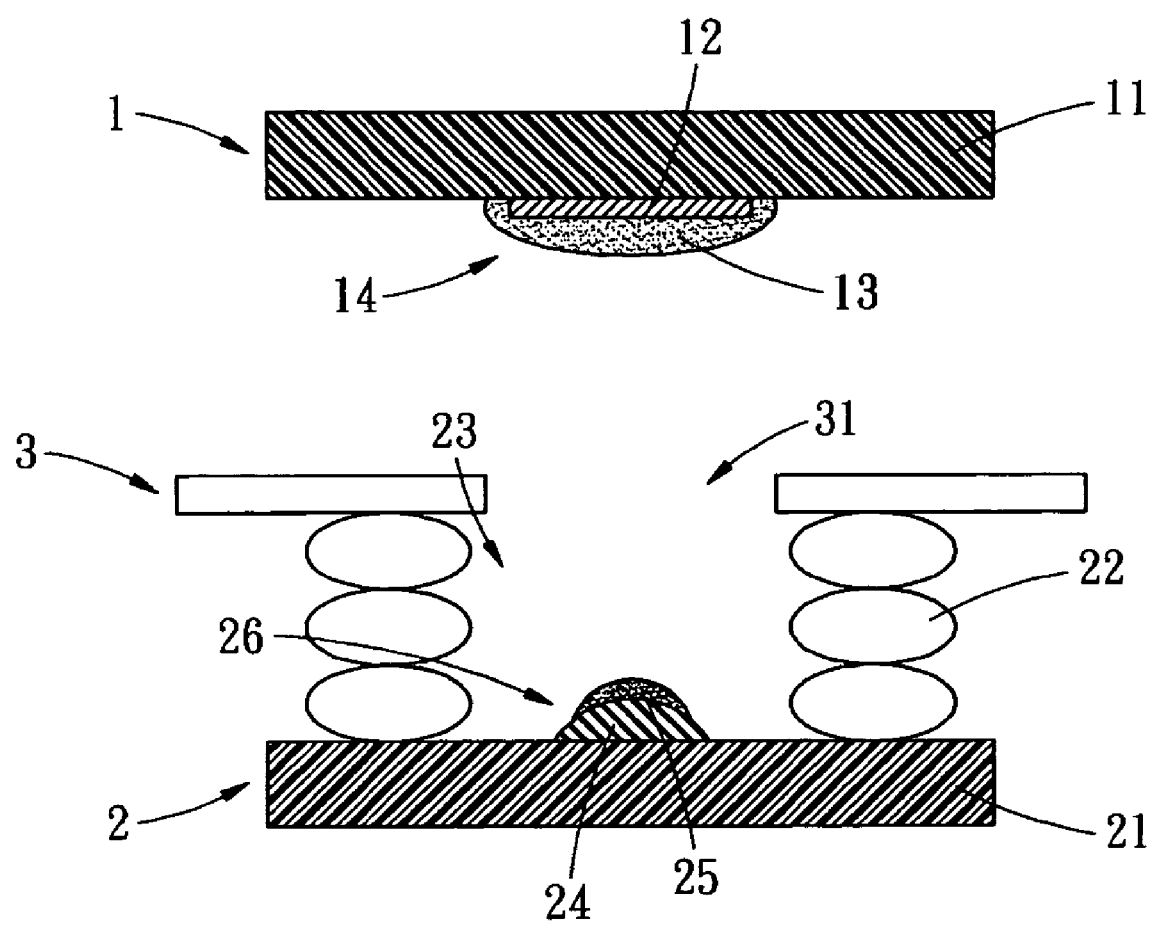
FIG. 2 shows a pixel structure of a carbon-nanotube field-emission display in one embodiment of the present invention.

Referring to FIG. 2, a pixel structure of a carbon nanotube field-emission display is illustrated. The carbon nanotube field-emission display includes an anode electrode layer 1, a cathode electrode layer 2, and a gate conductive layer 3 disposed between the anode and cathode electrode layers 1 and 2. The anode electrode layer 1 includes a plurality of anode electrodes 14 formed on a common substrate 11. Each of the anode electrodes 14 includes a first conductive layer 12 formed on the substrate 11 and a second conductive layer 13 wrapping the first conductive layer 12 therein. Preferably, the substrate 11 is fabricated from glass material, and the second conductive layer is fabricated from phosphor material.

The cathode electrode layer 2 includes a plurality of cathode electrodes 26 formed on a common substrate 21. Around at least one of the cathodes 26, a dielectric layer 22 is formed and patterned on the substrate 21. As shown, the dielectric layer 22 is patterned by photolithography and etching process to form a recessed region 23 in which the cathode 26 is encompassed thereby. The gate conductive layer 3 is then formed on the dielectric layer 22. As shown, aligned with each cathode 26 and the corresponding anode 14 is an aperture 31 (gate hole) extending through the gate conductive layer 3. Each cathode 26 includes a first conductive layer 24 in the shape of a semi-spherical lump as shown in FIG. 2. The protruding center of the first conductive layer 24 gradually descends towards the periphery thereof. On top of the central region of the first conductive layer 24, a second conductive layer 25 is formed by spray or photolithography. Thereby, the cathode 26 having all surface points equidistant to the gate conductive layer 3 is formed.

Figure 3:
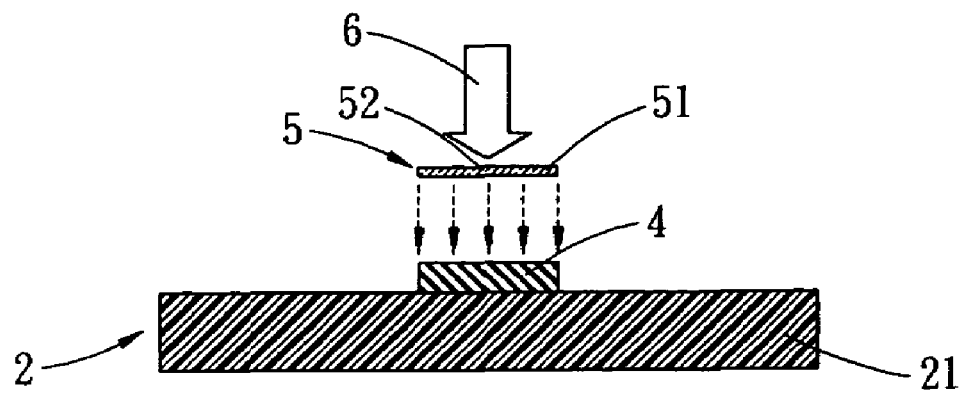
FIGS. 3 to 5 shows the process flow of a cathode electrode layer of the carbon-nanotube field-emission display.
Figure 4:
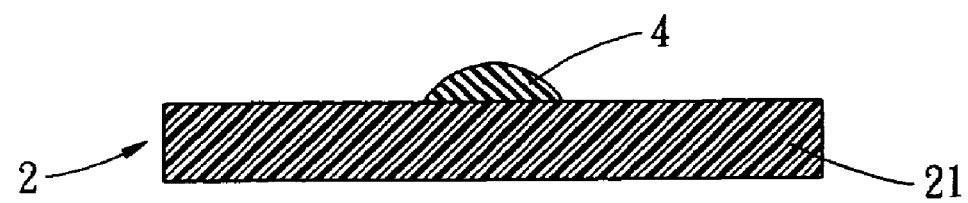
Figure 5:
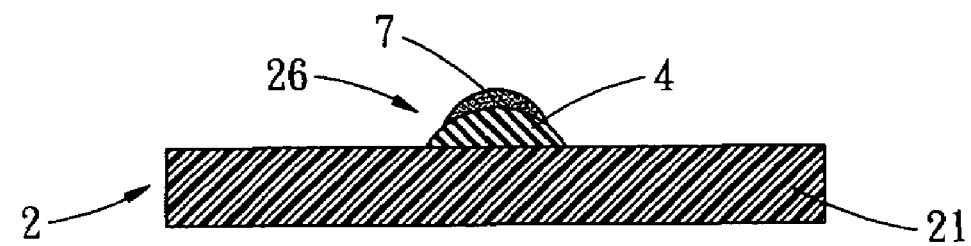

FIGS. 3 to 5 illustrate the fabrication process of the field-emission display as shown in FIG. 2. One of pixels is exemplarily shown in FIGS. 3 to 5. During the fabrication of the cathode electrode layer 26, a silver paste 4 with a thickness of about 20 microns is formed on the substrate 21 by screen printing. It is appreciated that the thickness may vary according to specific requirement. A gray-scale mask 5 is used to perform photolithography on the silver paste 4 using the gray-scale mask 5 as a photomask. The gray-scale mask 5 placed over the substrate 4 is radiated by a yellow light 6. In this embodiment, the gray-scale mask 5 allows about 20% of the yellow light radiation to pass through from a center 52 thereof and about 100% of the radiation to pass through from a periphery 51 thereof. Preferably, the transmission rate of the gray-scale mask 5 gradually increases from 20% at the center 52 to 100% at the periphery thereof. Therefore, after the yellow light radiation through the gray-scale mask 5, subsequent process is performed to result in a patterned silver paste 4 as shown in FIG. 4. As shown in FIG. 4, the patterned silver paste 4 gradually descends from the center to the periphery thereof. The patterned silver paste 4 serves as the first conductive layer 24.

As shown in FIG. 5, carbon nanotube powders 7 are sprayed on the surface of the first conductive layer 24. A vacuum sintering process is then performed allowing the carbon nanotube powders 7 adhered to the first conductive layer 24 to serve as the second conductive layer 25.

Figure 6:
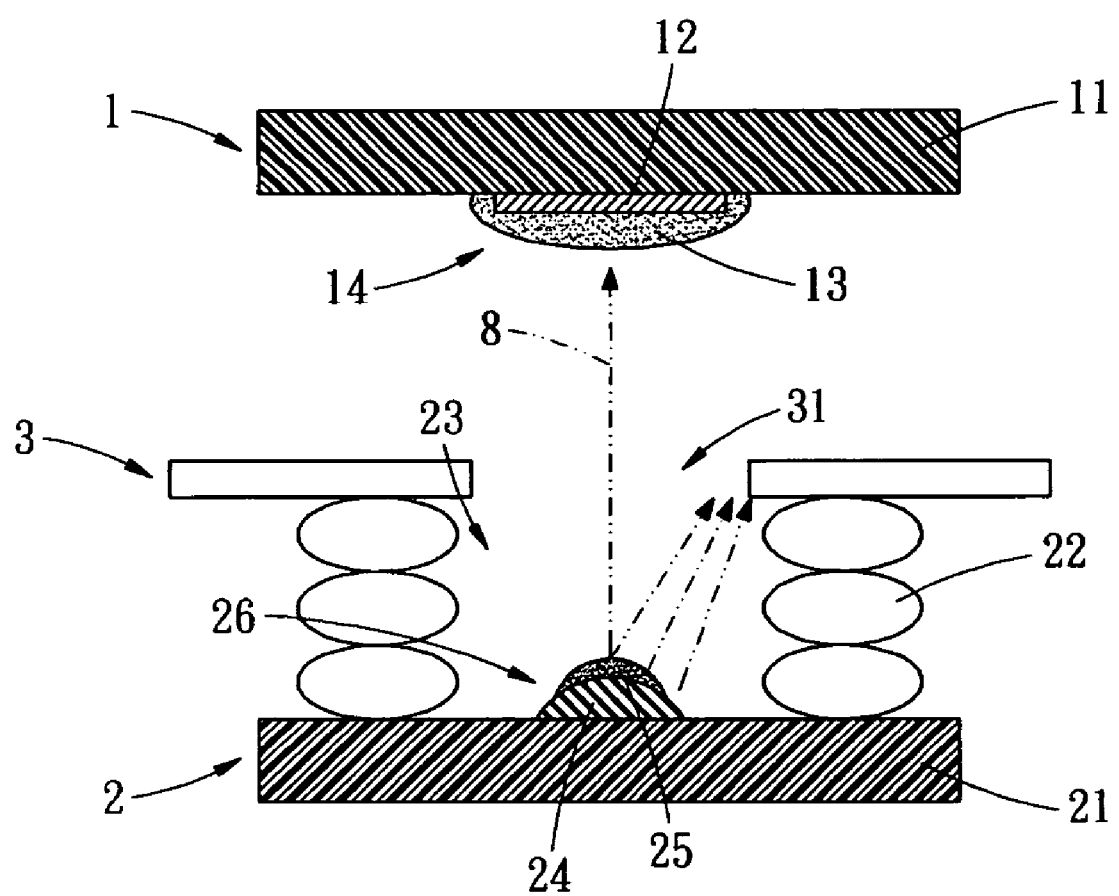
FIG. 6 shows the electron emission status of the pixel structure as shown in FIG. 2.

Referring to FIG. 6, in operation, an electron beam 8 generated by the cathode electrode 26 propagates through the aperture 31 of the gate conductive layer 3 to impinge upon the second conductive layer 13 of the anode 14. As the center of the cathode electrode 26 protrudes over the periphery thereof, the beeline distance between every surface point and the gate conductive layer 3 is identical. As a result, the electric field drained by the cathode electrode 26 for generating the electron beam is the same all over the cathode electrode 26. Therefore, the current density of the electron beam 8 is uniform, and the donut impurity of image displayed by each pixel is eliminated.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of fabricating a field emission display comprising:
   a step of forming at least one cathode electrode on a cathode substrate, including,
   screen printing a silver paste on the substrate;
   providing a gray-scale mask over the silver paste;
   exposing the silver paste with a light through the gray-scale mask, wherein the gray-scale mask has a gradually increasing transmission rate of the light from a center to a periphery thereof; and
   removing the portion of the silver paste that has been exposed by the light to form a first conductive layer, wherein the first conductive layer having a protruding center gradually descending towards a periphery thereof; and forming a second conductive layer on top of central region of the first conductive layer;
   forming a dielectric layer on the cathode substrate, wherein the dielectric layer is patterned to encompass the cathode electrode therein;
   forming a gate conductive layer on the dielectric layer, wherein the gate conductive layer has an aperture aligned with the cathode electrode; and
   a step of forming at least one anode electrode on an anode substrate over the gate conductive layer, wherein the anode electrode is aligned with the cathode electrode.

2. The method of claim 1, wherein the step of forming the anode electrode includes:
   forming an indium tin oxide layer on the anode substrate; and
   forming a phosphor layer on the indium tin oxide layer to wrap the indium tin oxide layer therein.

3. The method of claim 1, wherein the step of forming the cathode electrode further comprising:
   spraying a carbon nanotube on the first conductive layer to form the second conductive layer.

4. The method of claim 1, wherein the transmission rate at the center of the gray-scale mask is about 20% and the transmission rate at the periphery of the gray-scale mask is about 100%.

* * * * *